United States Patent [19]

Chen et al.

[11] Patent Number: 5,599,631

[45] Date of Patent: Feb. 4, 1997

[54] FLUORINATED ELASTOMER/FLUORINATED RESIN COMPOSITIONS FOR TONER FUSING MEMBERS

[75] Inventors: Jiann-H Chen, Fairport; Beta Y. Ni; Richard J. Kosakowski, both of Rochester, all of N.Y.

[73] Assignee: Eastman Kodak Company, Rochester, N.Y.

[21] Appl. No.: 399,067

[22] Filed: Mar. 8, 1995

[51] Int. Cl.⁶ ..................................................... B32B 27/00
[52] U.S. Cl. ........................... 428/421; 428/422; 428/457; 428/461; 428/906; 219/216; 492/56; 399/333
[58] Field of Search ............................ 528/244; 355/284, 355/285; 428/906, 421, 422, 457, 461; 219/216; 430/124; 492/56

[56] References Cited

U.S. PATENT DOCUMENTS

| | | | |
|---|---|---|---|
| 4,568,275 | 2/1986 | Sakurai | 432/60 |
| 5,035,950 | 7/1991 | Del Rosario | 428/421 |
| 5,233,008 | 8/1993 | Chen et al. | 528/33 |
| 5,253,027 | 10/1993 | Goto | 355/290 |
| 5,370,931 | 12/1994 | Fratangelo et al. | 428/334 |

*Primary Examiner*—William A. Krynski

[57] ABSTRACT

There is provided a fuser member having as its outermost layer, a substantially homogeneous composite comprising:

a) a continuous phase of a fluorocarbon elastomer selected from vinylidene fluoride based fluoroelastomers containing hexafluoropropylene and terpolymers of vinylidene fluoride, hexafluoropropylene and tetrafluoroethylene; and b) a discontinuous phase of a flourinated resin having a molecular weight between about 4,000 and 25,000.

5 Claims, No Drawings

FLUORINATED ELASTOMER/FLUORINATED RESIN COMPOSITIONS FOR TONER FUSING MEMBERS

FIELD OF THE INVENTION

This invention relates to a fuser roll useful for heat-fixing a heat-softenable toner material to a substrate. More particularly, the invention relates to fuser rolls that have a composite surface layer which includes a fluorinated elastomer and a fluorinated resin.

BACKGROUND OF THE INVENTION

Heat-softenable toners are widely used in imaging methods such as electrostatography, wherein electrically charged toner is deposited imagewise on a dielectric or photoconductive element bearing an electrostatic latent image. Most often in such methods, the toner is then transferred to a surface of another substrate, such as, e.g., a receiver sheet comprising paper or a transparent film, where it is then fixed in place to yield the final desired toner image.

When heat-softenable toners, comprising, e.g., thermoplastic polymeric binders, are employed, the usual method of fixing the toner in place involves applying heat to the toner once it is on the receiver sheet surface to soften it and then allowing or causing the toner to cool.

One such well-known fusing method comprises passing the toner-bearing receiver sheet through the nip formed by a pair of opposing rolls, at least one of which (usually referred to as a fuser roll) is heated and contacts the toner-bearing surface of the receiver sheet in order to heat and soften the toner. The other roll (usually referred to as a pressure roll) serves to press the receiver sheet into contact with the fuser roll.

The fuser roll usually comprises a rigid core covered with a resilient material, which will be referred to herein as a "base cushion layer." The resilient base cushion layer and the amount of pressure exerted by the pressure roll serve to establish the area of contact of the fuser roll with the toner-bearing surface of the receiver sheet as it passes through the nip of the pair of rolls. The size of this area of contact helps to establish the length of time that any given portion of the toner image will be in contact with and heated by the fuser roll. The degree of hardness (often referred to as "storage modulus") and stability thereof, of the base cushion layer are important factors in establishing and maintaining the desired area of contact.

One type of material that has been widely employed in the past to form a resilient base cushion layer for fuser rolls is condensation-crosslinked poly(dimethylsiloxane) elastomer. "Poly(dimethylsiloxane)" will sometimes be alternatively referred to herein as "PDMS".

Fluorocarbon resins like polytetrafluoroethylene (PTFE) or a copolymer of PTFE and perfluoroalkylvinylether, or fluorinated ethylenpropylene have excellent release characteristics due to very low surface energies, high temperature resistance, and excellent chemical resistance. Fluorocarbon resins are, however, less flexible and elastic than polysiloxane elastomers and are therefore not suitable alone as the surface of the fuser roll.

Polyfluorocarbon elastomers, such as vinylene fluoride-hexafluoropropylene copolymers, are tough, wear resistant and flexible elastomers that have excellent high temperature resistance, but relatively high surface energies, which compromise toner release. This can be seen in the comparative examples below.

Some fusing systems use a release oil, such as a PDMS oil, to prevent offset, that is, to aid the roll in releasing from the toner it contacts during the fusing operation. During use, the oil is continuously coated over the surface of the fuser member in contact with the toner image. Unfortunately, the materials that are used for the fusing member can be affected by the oil, causing swelling. Swelling causes an undesirable change in the nip uniformity and undesirable wear characteristics. The swelling of the fuser roller materials has been a continuing problem.

In U.S. Pat. No. 4,568,275 there is described a fuser roll having a layer of a fluorinated rubber and a fluorinated resin powder. However, the fluorinated rubber that is disclosed is water dispersable and it is known that the mixture phase-separates on coating so that the fluorinated resin that is used comes to the surface of the layer. In a comparative example below, it is shown that this composition has marginal release properties and marginal wear characteristics.

In U.S. Pat. No. 5,253,027, there is described a fluorinated resin in a silicon elastomer. However, composites of this type exhibit unacceptable swell in release oils.

Thus, it has been extremely difficult to provide a fuser roller with, at the same time, good wear resistance, good release properties and low swell when exposed to release oils. It is to a solution to this problem that the present invention is directed.

SUMMARY OF THE INVENTION

In accordance with the present invention there is provided a fuser member having as its outermost layer, a substantially homogeneous composite comprising:

a) a continuous phase of a fluorocarbon elastomer selected from vinylidene fluoride based fluoroelastomers containing hexafluoropropylene and terpolymers of vinylidene fluoride, hexafluoropropylene and tetrafluoroethylene; and b) a discontinuous phase of a flourinated resin having a molecular weight between about 4,000 and 25,000.

DETAILED DESCRIPTION OF THE INVENTION

As will be seen from the examples below, the composites used in the present invention have an excellent combination of excellent wear resistance, excellent release properties, even with low rates of release oils, and virtually no swell in release oils. This combination of properties could not have been expected by those of skill in this art particularly since similar materials do not have this excellent combination of properties.

One of the principal components of the composites of the invention is a fluorocarbon elastomer. This component is the continuous phase of the layer. Suitable fluorocarbon elastomers include the vinylidene fluoride based fluoroelastomers containing hexafluoropropylene known commercially as Viton™ A. Also suitable are the terpolymers of vinylidene fluoride, hexafluoropropylene and tetrafluoroethylene known commercially as Viton™ B. Viton™ A and Viton™ B and other Viton™ designations are trademarks of E.I. dupont de Nemours and Company. Other suitable commercially available materials include, for example, vinylidene fluoride-hexafluoropropylene elastomers Fluorel™ FX 2530 and Fluorel™ FX 9038. These elastomers are particularly preferred since they can contain high levels of fluorene compared to many similar types of elastomers. They typically contain about 70 molar percent flourine. Fluorel™ is a trademark of the 3M Company. Other vinylidene fluoride based polymers which can be used are disclosed in U.S. Pat. No. 5,035,950. Mixtures of the foregoing vinylidene fluoride-based fluoroelastomers may also be suitable. Although it is not critical in the practice of this invention, the number-average molecular weight range of the fluorocarbon copolymers or terpolymers may vary from a low of about 10,000 to a high of about 200,000. In the more preferred embodiments, the vinylidene fluoride-based fluoroelastomers have a number-average molecular weight range of about 50,000 to about 100,000.

After coating, the described fluorocarbon etastomer/fluorinated resin composites are cured using a curing agent. The curing can be accelerated using a curing accelerator.

Suitable fluorocarbon-curing agents or crosslinking agents include the nucleophilic addition curing agents as disclosed, for example, in the patent to Seanor, U.S. Pat. No. 4,272,179. The nucleophilic addition cure system is well known in the prior art. Exemplary of this cure system is one comprising a bisphenol crosslinking agent and an organophosphonium salt as accelerator. Suitable bisphenols include 2,2-bis(4-hydroxyphenyl) hexafluoropropane, 4,4-isopropylidenediphenol and the like. Although other conventional cure or crosslinking systems may be used to cure the fluoroelastomers, for example, free radical initiators, such as an organic peroxide, for example, dicumylperoxide and dichlorobenzoyl peroxide, or 2,5-dimethyl-2,5-di-t-butylperoxyhexane with triallyl cyanurate, the nucleophilic addition system is preferred.

Suitable accelerators for the bisphenol curing method include organophosphonium salts, e.g., halides such as benzyl triphenylphosphonium chloride, as disclosed in U.S. Pat. No. 4,272,179 cited above.

Curing of the composite is carried out according to the well known conditions for curing vinylidene fluoride based copolymers ranging, for example, from about 12–48 hours at temperatures of between 50° C. to 350° C. Preferably the coated composition is dried until solvent free at room temperature, then gradually heated to about 320° C. over 24 hours, then maintained at that temperature for 20 minutes or longer.

The fluorinated resins useful in the composites described herein are commercially available. Typical materials include Vydax™ materials available from E.I. dupont de Nemours and Company. Particularly useful fluorinated resins include a mixture of ω-hydro-α-(methylcyclohexyl)-polytetrafluoroethylene and α-chloro-ω-(2,2-dichlorotrifluoroethyl) polytetrafluoroethylene, available as Vydax™ Ar/IPA having an average molecular weight of 4,000; and single component α-chloro-ω-(2,2-dichlorotrifluoroethyl) polytetrafluoroethylene, available as Vydax™ 1000/IPA having an average molecular weight of 25,000.

The described composite has a continuous phase which is a fluorocarbon elastomer and a discrete phase which is a fluorinated resin. The layer formed of the composite is "substantially homogeneous". This can be determined by ATR-IR (attenuated total reflectance, infred red spectroscopy). With the composites of the present invention, the infrared spectrum of both the elastomer and the resin will be represented. This is in contrast to the compositions described in U.S. Pat. No. 4,568,275, cited above, which are known to phase separate. In other words, the particles of the fluorinated resins in the compositions described in '275 tend to accumulate in the top of the layers and this will be reflected in the ATR-IR.

The ratio of the fluorocarbon elastomer to the fluorinated resin in the composites of the invention range from 8:1 to 1:8; preferably 4:1 to 1:1.

The composite layer used in the present invention can contain other materials as is conventional in this art. Inert fillers can be added to the composites to provide added strength and abrasion resistance to a surface layer. Suitable inert fillers which are optionally used for producing these composites include mineral oxides, such as alumina, silicate or titanate, and carbon of various grades. Nucleophilic addition-cure systems used in conjunction with fluorocarbon copolymers can generate hydrogen fluoride and thus acid acceptors are added as fillers. Suitable acid acceptors include Lewis acids such as metal oxides or hydroxides, for example, magnesium oxide, calcium hydroxide, lead oxide, copper oxide and the like, which can be used alone or as mixtures with the aforementioned inert fillers in various proportions.

Other addenda can also be added such as pigments. When present, the fillers and other possible addenda are typically present in an amount of between about 3 and 60 by weight based on the total weight of the composite.

Suitable materials for the base cushion layer include any of a wide variety of materials previously used for base cushion layers, such as the condensation cured polydimethylsiloxane marketed as EC4952 by Emerson Cuming. An example of a condensation cured silicon rubber base cushion layer is GE 4044 marketed by General Electric. An example of an addition cured silicone rubber is Silastic™ J RTV marketed by Dow Corning applied over a silane primer DC-1200 also marketed by Dow Corning.

In a particular embodiment of the invention, the base cushion is resistant to cyclic stress induced deformation and hardening. Such materials when subjected to cyclic stress, exhibit changes in length and hardness (storage modulus) of less than about 20 percent. Examples of suitable materials are filled condensation-crosslinked PDMS elastomers. Suitable filler include copper oxide, zinc oxide, chromium oxide filler and tin oxide filler. These materials all show reasonable heat conductivities and much less change in hardness and creep than EC4952 or the PDMS elastomer with aluminum oxide filler.

The core of the fuser member is usually cylindrical in shape. It comprises any rigid metal or plastic substance. Metals are preferred when the fuser member is to be internally heated, because of their generally higher thermal conductivity. Suitable core materials include, e.g., aluminum, steel, various alloys, and polymeric materials such as thermoset resins, with or without fiber reinforcement. The core can be a support which has been conversion coated and primed with metal alkoxide primer in accordance with a U.S. Pat. No. 5,474,821, issued Dec. 12, 1995, entitled "FUSING MEMBER FOR ELECTROSTATOGRAPHIC REPRODUCING APPARATUS AND METHOD FOR PREPARING FUSING MEMBER".

The rolls of the invention can be coated with the described composite by conventional techniques. Solvent transfer coating techniques can be used. Coating solvents which can be used include polar solvents, for example, ketones, acetates and the like. Preferred solvents for the fluoroelastomer based composites are ketones, especially methyl ethyl ketone and methyl isobutyl ketone. The composites are dispersed in the coating solvent at a concentration of between about 10 to 50 weight percent, preferably between about 20 to 30 weight percent and coated on the fusing member to give a 10 to 250 micron thick layer on drying.

The coated article is cured under the conditions described above.

Other coating methods include ring coating, dip coating and disk coating using the same solvents mentioned above. Ring coating an overcoat layer is currently preferred. In ring coating, a ring or gasket of the proper diameter is provided. The roll is brought up through the ring and coating material is provided on the top of the ring or gasket. As the roll passes, coating composition is taken up by the roll. The thickness is determined by the viscosity of the coating composition, by the speed at which the roll is drawn up through the ring and other factors known in the art.

The thicknesses of the base cushion and outer layers and the composition of the base cushion layer can be chosen so that the base cushion layer can provide the desired resilience to the fuser member, and the outer layer can flex to conform to that resilience. The thickness of the base cushion and outer layers will be chosen with consideration of the requirements of the particular application intended. Usually, the outer layer would be thinner than the base cushion layer. For example, base cushion layer thicknesses in the range from 0.6 to 5.0 mm have been found to be appropriate for various applications. In some embodiments of the present invention, the base cushion layer is about 2.5 mm thick, and the outer layer, comprising the composite described herein can be from about 25 to 250 micrometers thick.

Where the composition described herein is used alone, the thickness can range from about 25 to 250 micrometers thick.

Some fusing systems use a release oil, such as a PDMS oil, to prevent offset, that is, to aid the roll in releasing from the toner it contacts during the fusing operation. During use, the oil is continuously coated over the surface of the fuser member in contact with the toner image. The fuser member of the invention can be used with polydimethylsiloxane or mercapto functionalized polydimethylsiloxane release oils at normally used application rates or at reduced application rates, from about 0.5 mg/copy to 10 mg/copy (the copy is 8.5 by 11 inch 20 pound bond paper. The release properties of the composites described herein are particularly advantageous and therefore application rates can be on the lower end of the described range, e.g. 0.5 mg/copy.

The fuser member is mainly described herein in terms of embodiments in which the fuser member is a fuser roll having a core, a base cushion layer overlying the core, and an outer layer superimposed on the base cushion. The invention is not, however, limited to a roll, nor is the invention limited to a fusing member having a core bearing two layers: the base cushion layer and the outer layer. The fuser member of the invention can have a variety of other configurations and layer arrangements known to those skilled in the art.

The rolls produced in accordance with the present invention are thus useful in electrophotographic copying machines to fuse heat-softenable toner to a substrate. This can be accomplished by contacting a receiver, such as a sheet of paper, to which toner particles are electrostaticly attracted in an imagewise fashion with such a fusing member. Such contact is maintained at a temperature and pressure sufficient to fuse the toner to the receiver.

The following examples are presented for a further understanding of the invention.

EXAMPLES

Cylindrical aluminum cores were cleaned, washed to remove contaminants and coated with a conventional silicone priming agent, the primed cores were dried and coated with a layer of polydimethylsiloxane elastomer which was then cured to provide a resilient underlayer having a dry thickness of 2.5 millimeters. The roll was surface ground, and cured again. After curing, the underlayer was treated by corona discharge to improve adhesion of the outer layer that forms a fusing surface according to this invention.

The outer layer or fusing surface was prepared using a fluoroelastomer/fluorinated resin composite described in the following Examples. The composition comprising uncured fluoroelastomer (including the curing agents), fluorinated resin, and fillers (magnesium oxide and calcium oxide) was compounded on a 2-roll mill until a uniform blend was obtained.

The blend was then dispersed in methyl ethyl ketone solvent with stirring for a minimum of 2 hours. The dispersion was stirred slowly to avoid settling, kept sealed to prevent solvent loss and exposure to atmospheric moisture, and then ring coated on a resilient underlayer at a temperature of 21° C. (Relative Humidity 50 percent), to form an outer layer having a dry thickness of 30 micrometers. This outer layer was cured using the following conditions:

Air dry 24 hours 24 hours ramp to 320° C.

20 minutes at 320° C.

Wear Test

The wear rate test of coatings on a stainless steel sheet was performed using a commercially available Norman Abrader Device. For this test, the abrader device was modified by replacing the standard grommet wheel with an aluminum rod, placing a renewable paper strip on the samples and running the tests at about 175° C. After 1600 cycles, the step, which is the height of the indentation in the sheet, was measured. This is the result that is reported in the table.

Offset Test

The method of screening formulations for toner off-set phenomenon is described as follows. A piece of roller material is in static contact with a piece of paper with 100 percent toner (HX Toner, available from Eastman Kodak Company) laydown under a pressure of 80 psi (551.6 kPa) at a fusion temperature of 170° C. A nip area is formed on the roller material during the contact. The piece of paper is peeled off from the roller material after various lengths of contact time, and the nip area on the roller material is examined under an optical microscope. The contact time can be translated into number of copies through machine nip dwell time. The maximum time for the tests reported in the table was 20 minutes number of copies=contact time/nip dwell time The longer the contact time needed to develop toner off-set in the nip area in this off-line test, the greater the number of copies a roller can handle before it shows toner off-set in a machine.

Oil Swell

Oil swell is defined as the percent weight gain due to imbibed oil. A 2.5 mm slab is suspended by wire in test tubes containing 10 grams of 350 centistoke PDMS oil. The samples are incubated at 175° C. for seven days.

$Swell = (W_f - W_o)/W_o$ where $W_o$ and $W_f$ are the initial and final weights of the samples.

Release Test

The fuser roll was used in the fuser assembly of Ektaprint™ 1575 Copier (Trademark of Eastman Kodak Company) to fix an image of dry toner particles (HX Toner). In the table, "NA" means that the test was not done. Tests were run with no release agents as a severe test of the release characteristics of the layers. In practice, some oil would always be used. The fusing conditions and release oil were as follows:

| | |
|---|---|
| Fuser roll temperature | 193° C. |
| Pressure roll temperature | 193° C. |
| Release oil | 0 and 0.5 mg/copy, polydimethylsiloxane oil, 60k cts viscosity |
| Test document | Jail bars, Toner laydown density 1.2 mg/cm$^2$ |
| Speed | 30 cm/sec |

The number of copies to the first paper jam is recorded. The paper jam is caused by the eventual failure of the copy sheet to release from the fuser roll.

In the table, there are several comparative compositions and composites of the invention. "FX 2530" and "FX 9038" are identified previously as Fluorel™ FX 2530 and Fluorel™ FX 9038. The Vydax™ is also previously identified and in each case was the "AR/IPA". The "FLC" comparative example is a commercially available water dispersable fluorocarbon elastomer/fluorinated resin composition as described in U.S. Pat. No. 4,568,275 identifed above. It is availabel from Daikin KK in Japan. The "EC 4952" is uncoated base cushion layer. Vydax™ was not coated alone because of the anticipated poor wear resistance of such a layer and the high curing temperatures which would be needed.

Another roll was prepared except that fluorinated resin was a high molecular weight polytetrafluoroethylene powder. (DLX6000 Teflon™ powder) A non-uniform outer layer surface was produced which could not be tested because of the rough surface.

The results for these rolls are found in Table 1 below:

TABLE 1

| Surface | Wear Micron | Offset | Swell | Release No Oil | Release 0.5 mg |
|---|---|---|---|---|---|
| FX2530/ Vydax 4:1 | 5 | 20 min | nil | 700 | 11.5K |
| FX9038/ Vydak 2:1 | 20 | none | nil | NA | 40K |

TABLE 1-continued

| Surface | Wear Micron | Offset | Swell | Release No Oil | Release 0.5 mg |
|---|---|---|---|---|---|
| FX2530/ Vydak 1:1 | 30 | none | nil | 16K | >40K |
| Comparative Examples | | | | | |
| FLC | 35 | none | nil | 1K | 35K |
| FX2530 | 5 | 1 min | nil | 3 | NA |
| FX9038 | 5 | 20 min | nil | NA* | NA* |
| EC4952 | 95 | 1 min | 8% | >40K | >40K |

*Not tested because it can be assumed to be at approximately as poor as FX2530.

As can be seen from the examples, the uncoated base cushion layer had good release properties but poor swell and high wear. The "FLC" had marginal wear and poor release performance in the high stress release test (no oil) and very marginal in the release test at 0.5 mg oil. The compositions of the invention had good combinations of properties.

The invention has been described with particular reference to preferred embodiments thereof but it will be understood that modifications can be made within the spirit and scope of the invention.

We claim:

1. A fuser member having as its outermost layer, a substantially homogeneous cured composite comprising:
   a) a continuous phase of a fluorocarbon elastomer selected from vinylidene fluoride based fluoroelastomers containing hexafluoropropylene and terpolymers of vinylidene fluoride, hexafluoropropylene and tetrafluoroethylene; and
   b) a discontinuous phase of a flourinated resin having a molecular weight between about 4,000 and 25,000,
   wherein the ratio of fluorocarbon elastomer to fluorinated resin is between about 8:1 and 1:8.

2. The fuser member according to claim 1 wherein the fluorinated resin is a mixture of ω-hydro-α-(methylcyclohexyl)-polytetrafluoroethylene and α-chloro-ω-(2,2-dichlorotrifluoroethyl) polytetrafluoroethylene.

3. A fuser member according to claim 1 comprising a core, a base cushion layer overlying said core and said outermost layer.

4. A fuser member according to claim 3 wherein said base cushion layer is condensation cured polydimethylsiloxane.

5. A fuser member according to claim 1 wherein said fluorocarbon elastomer contains about 70 molar percent fluorine.

* * * * *